United States Patent [19]

Talavera

[11] Patent Number: 4,891,877

[45] Date of Patent: Jan. 9, 1990

[54] PORTABLE TOOL FOR COMPRESSING A FITTING ON A HOSE

[76] Inventor: Dino Talavera, P.O. Box 871690, Wasilla, Ak. 99687

[21] Appl. No.: 325,861

[22] Filed: Mar. 20, 1989

[51] Int. Cl.[4] .................................... B23P 19/04

[52] U.S. Cl. .................................... 29/237; 29/275

[58] Field of Search .................. 72/402, 409, 410, 412, 72/452, 453.15, 453.16, 394, 367, 416; 29/237, 243.52, 243.53, 243.54, 272, 254, 275, 255; 269/43

[56] References Cited

U.S. PATENT DOCUMENTS

| | | | |
|---|---|---|---|
| 160,696 | 3/1875 | Morse | 29/237 |
| 1,296,222 | 3/1919 | Russ | 29/237 |
| 1,782,219 | 11/1930 | Wallace . | |
| 1,869,778 | 8/1932 | Roberts | 29/272 |
| 2,314,236 | 3/1943 | Mott . | |
| 2,958,929 | 11/1960 | Vineberg et al. . | |
| 3,731,518 | 5/1973 | Blocher . | |
| 3,848,451 | 11/1974 | Allin | 72/402 |
| 4,276,765 | 7/1981 | Yoneda | 72/402 |
| 4,418,458 | 12/1983 | Hunter | 29/237 |
| 4,427,191 | 1/1984 | Hess | 269/43 |
| 4,713,868 | 12/1987 | Grabowski | 29/275 |

FOREIGN PATENT DOCUMENTS

| | | | |
|---|---|---|---|
| 710088 | 5/1965 | Canada | 72/402 |

*Primary Examiner*—Robert C. Watson

*Attorney, Agent, or Firm*—Warren F. B. Lindsley

[57] ABSTRACT

A portable tool for compressing a fitting on a high pressure hose comprising identical forged and machined parts that are held in alignment by parallelly positioned bolts that extend therethrough. The parts moved toward each other when a hammer or the like is applied to the outside surface of one of the parts. The parts have aligned mating surfaces each defining a die in their opposed surfaces for compressing a fitting to a hose when the hammer or like force is applied thereto. Shims are used to reduce the size of each die so that the tool can be used with an assortment of hose fittings on a variety of hose sizes.

3 Claims, 1 Drawing Sheet

FIG. 1
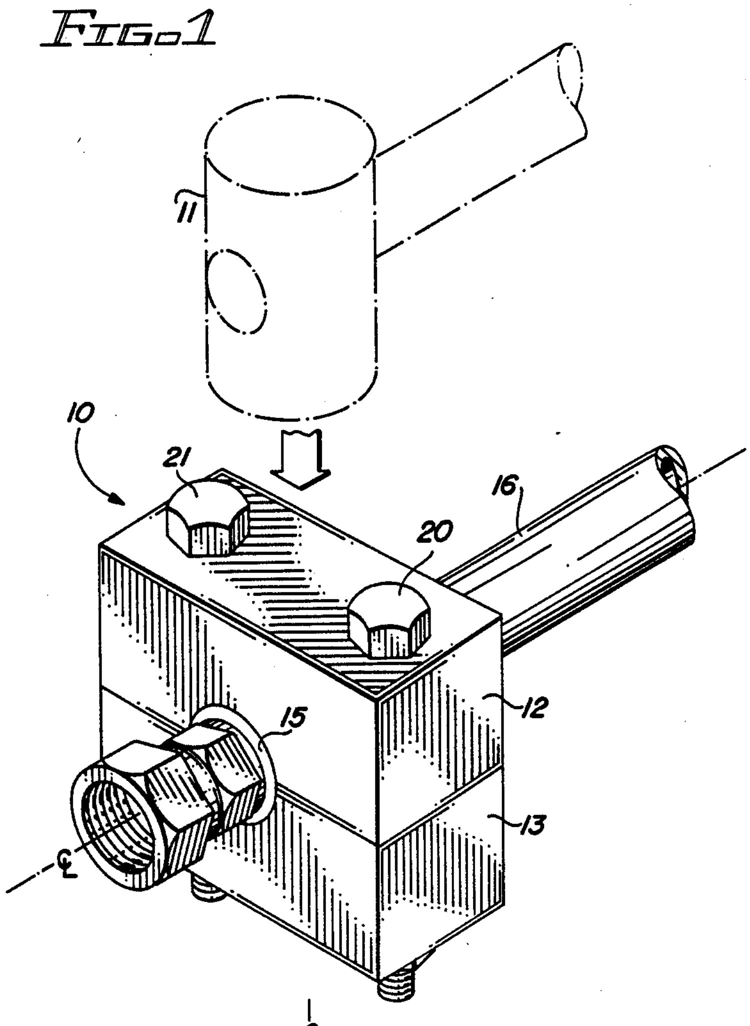
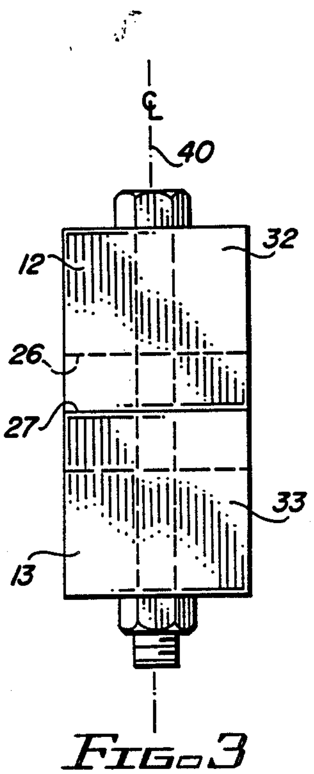
FIG. 3
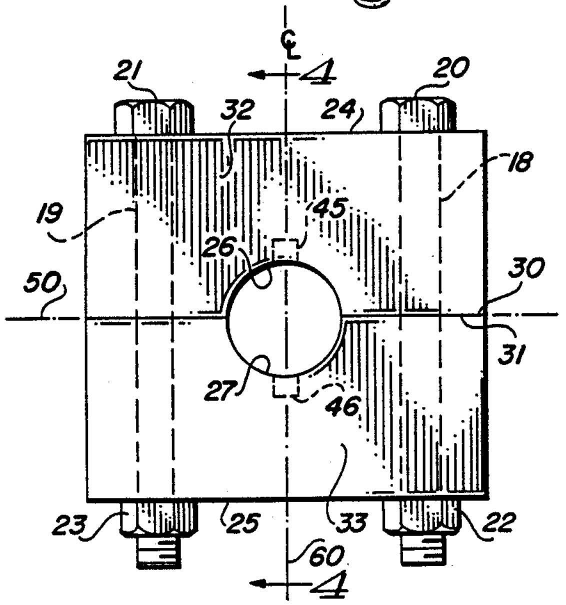
FIG. 2
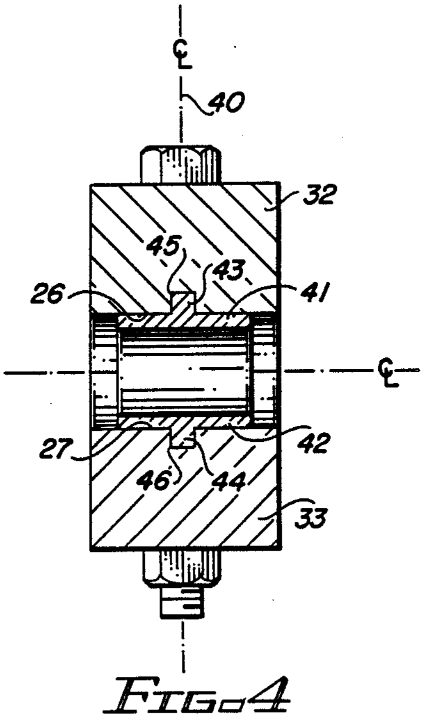
FIG. 4

PORTABLE TOOL FOR COMPRESSING A FITTING ON A HOSE

BACKGROUND OF THE INVENTION

This invention relates to a tool for compressing a fitting on a hose and more particularly to a portable tool for compressing fittings of various sizes to the ends of high pressure flexible hoses.

Screw-on type hose fittings have been used in the field, i.e. away from an electrical power source, however, when a source of electrical power is available, metal deformation type of non-reusable hose fittings are preferred. This type of hose fittings require an electrically actuated press which is usually immobile.

The immobility and high investment costs of a power actuated compression tool has required the layman to purchase a large supply of screw-on type of reusable hose fittings to cover every size hose in his stock.

Thus, a need exists for an improved portable compression tool for installing hose fittings onto a variety of hoses of various sizes which does not require a source of electrical power.

DESCRIPTION OF THE PRIOR ART

U.S. Pat. No. 2,314,236 discloses a device for assembling high pressure hose fittings to the end of a flexible hose comprising a mold having an upper part and a lower part. Guide pins keep the mold parts in alignment with pressure being applied to the mold through a press arbor.

U.S. Pat. No. 1,782,219 discloses a machine for use in assembling hose coupling parts. The relatively movable members of the machine are actuated by air under pressure.

Of general interest are U.S. Pat. Nos. 2,958,929 and 3,721,518.

U.S. Pat. No. 2,958,929 discloses a method of joining the ends of two electrical conductors by compressing both of the conductors to be joined and the connecting ferrule so that the outside diameters of both conductors and ferrule are equal.

U.S. Pat. No. 3,721,518 discloses a crimping device for crimping fittings on high pressure hoses in which a separate die is made up of a pair of die bodies having registering cavities to receive the fittings to be crimped.

None of these patents disclose a die sized to compress a limited number of different diameter hoses.

SUMMARY OF THE INVENTION

In accordance with the invention claimed, a new and improved portable tool for compressing a fitting on a high pressure hose is provided which eliminates the deficiencies of the prior art compression tools and is adaptable for use on a variety of sizes of pressure hoses.

It is, therefore, one object of this invention to provide an improved compression tool which is mobile employing a minimal number of parts and is applicable for use away from a power source.

Another object of this invention is to provide an improved compression tool employing two cooperating aligned parts which are driven toward each other by a hammer or the like.

A further object of this invention is to provide an improved compression tool for applying fittings to high pressure hoses which can be used on a variety of hose diameters.

A still further object of this invention is to provide a new and improved compression tool for placing fittings on a variety of high pressure hoses of various diameters without the need of taking the hoses to a repair shop.

Further objects and advantages of the invention will become apparent as the following description proceeds; and the features of novelty which characterize this invention will be pointed out with particularity in the claims annexed to and forming a part of this specification.

BRIEF DESCRIPTION OF THE DRAWING

This invention may be more readily described by reference to the accompanying drawing, in which:

FIG. 1 is a perspective view of a tool for compressing fittings on a variety of hose sizes with a hose and fitting in position in the tool and a hammer shown in dash lines for use therewith;

FIG. 2 is a front view of the tool;

FIG. 3 is a side view of the tool; and

FIG. 4 a cross-sectional view of FIG. 2 taken along the line 4—4.

DESCRIPTION OF THE PREFERRED EMBODIMENT

Referring more particularly to the drawing by characters of reference, FIGS. 1–4 disclose a compression tool 10 comprising a pair of identical forged and machined parts 12 and 13 which are aligned for receiving therebetween a high pressure hose fitting 15 which is compressed onto a hose 16.

As noted from FIGS. 2 and 3, the machine parts 12 and 13 are vertically aligned along a plane 40 and define a plane 50 between their mating surfaces. These parts define axially aligned spaced holes 18 and 19 one on each side of plane 40 that extend perpendicular to plane 50 for receiving bolts 20 and 21 and their associated nuts 22 and 23 for maintaining alignment of parts 12 and 13 during use.

Machined part 12 includes a top or upper face 24 which is parallel with plane 50 and is the surface that will accept the blow of a hammer 11, as shown by dash lines in FIG. 1, for compressing a fitting positioned in the compression tool 10. An opposite identical surface 25 of the tool is considered its bottom.

A pair of mating compression dies 26 and 27 are formed in and comprise a part of faces 30 and 31 of the integral intermediate portions 32 and 33 of machined parts 12 and 13. These intermediate portions 32 and 33 are coplanarly aligned with each other and with plane 40.

Dies 26 and 27 provide smooth machined surfaces that run longitudinally and parallel with the intersection of planes 50 and 60, as shown in FIG. 2, and are designed to compress a particular range of compression fittings on hoses of various diameters.

As noted from FIG. 4, to compress a range of fittings and hose sizes, dowels or shims 41 and 42 can be inserted into and flush against the faces of compression dies 26 and 27. Integral with and extending outwardly from dowels or shims 41 and 42 are pins 43 and 44 which insert or penetrate into holes 45 and 46 in the faces of die 26 and 27 and into intermediate parts 32 and 33. Pins 43 and 44 hold dowels or shims 41 and 42 stationary during compression of a range of fittings on hoses of various sizes.

In order to obtain consistent and reliable compression of the fittings, bolts 20 and 21 are used to maintain alignment. These bolts join machine parts 12 and 13 by extending through intermediate parts 32 and 33 via drilled holes 18 and 19. To apply a slight pressure during compression, bolts 20 and 21 are threaded on one end upon which are threadedly attached nuts 22 and 23. A majority of the compression force is applied by a hammer 11 or the like, while bolts 20 and 21 and associated nuts 22 and 23 are tightened onto the fittings to assure proper alignment during the application on the hammer force.

Although but one embodiment has been illustrated and described, it will be apparent to those skilled in the art that various changes and modifications may be made therein without departing from the spirit of the invention or from the scope of the appended claims.

What is claimed is:

1. A portable tool for compressing a fitting on an associated hose comprising:

a pair of machined parts held together by a pair of bolts extending through spaced parallel openings extending through said parts, said parts having mating surfaces machined to each form a die for receiving therein a hose fitting positioned to extend between and perpendicular to the longitudinal axis of said bolts, at least one of said parts defining a surface on the outside of said tool parallel with and spaced from said mating surfaces, said one of said surfaces being provided for receiving a blow from a hammer for causing said machine parts to move toward each other to cause the dies to crimp the fitting placed therein around the end of an associated hose, and shim means one mounted in each die in said mating surfaces for rendering said tool usable for fittings and hoses of various diameters, said shim means comprising a pair of plates one fitted to each die of each of said mating surfaces for varying the size of each die, whereby said tool may be usable with fittings and hoses of various sizes, each of said plates comprising a pin for extending into one of the mating surfaces of said parts, said bolts and associated openings extending through said parts in a direction substantially parallel with the direction of force applied to said one of said surfaces, whereby said bolts may be periodically tightened to maintain alignment of said parts during application of said force.

2. The tool set forth in claim 1 wherein:

said pair of machine parts are identical, and said parts have parallel juxtapositioned mating surfaces.

3. The tool set forth in claim 1 wherein:

said parts each define a like surface on opposite sides of said tool parallel with and spaced a like distance from said mating surfaces.

* * * * *